United States Patent
Fukutani et al.

(10) Patent No.: US 8,906,514 B2
(45) Date of Patent: Dec. 9, 2014

(54) REINFORCEMENT MATERIAL FOR RUBBER, RUBBER PRODUCT USING THE MATERIAL AND METHOD FOR PRODUCING THE PRODUCT, PNEUMATIC TIRE USING THE MATERIAL AND METHOD FOR PRODUCING THE TIRE

(75) Inventors: Shuichi Fukutani, Onomichi (JP); Hidenori Matsushima, Ono (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 1001 days.

(21) Appl. No.: 10/540,884

(22) PCT Filed: Jan. 22, 2004

(86) PCT No.: PCT/JP2004/000553
§ 371 (c)(1),
(2), (4) Date: Jun. 27, 2005

(87) PCT Pub. No.: WO2004/065686
PCT Pub. Date: Aug. 5, 2004

(65) Prior Publication Data
US 2006/0081319 A1    Apr. 20, 2006

(30) Foreign Application Priority Data

Jan. 24, 2003  (JP) ................. 2003-015631
Jan. 24, 2003  (JP) ................. 2003-016054

(51) Int. Cl.
*B60C 9/00*    (2006.01)
*B29D 30/38*   (2006.01)
(Continued)

(52) U.S. Cl.
CPC ............ *B29D 30/38* (2013.01); *B29D 30/70* (2013.01); *B60C 9/0007* (2013.01); *B60C 9/18* (2013.01); *B60C 9/22* (2013.01); *B60C 9/263* (2013.01); *D07B 1/0606* (2013.01); *D07B 1/0646* (2013.01); *D07B 2201/2007* (2013.01); *D07B 2201/2022* (2013.01); *D07B 2501/2046* (2013.01)
USPC .......................... 428/592; 152/527

(58) Field of Classification Search
CPC .. B60C 9/0007; B60C 9/0042; B60C 9/0057; B60C 9/0064; B60C 9/18; B60C 9/26; B29D 30/38; D07B 1/062; D07B 1/0606
See application file for complete search history.

(56) References Cited

U.S. PATENT DOCUMENTS 988,490 A * 4/1911 Nehr ................................. 267/74
1,075,320 A * 10/1913 Bachmann et al. ............. 267/74
(Continued)

FOREIGN PATENT DOCUMENTS

JP  62-238104 A  10/1987
JP  63-096338 A   4/1988
(Continued)

OTHER PUBLICATIONS

English machine translation of Japanese Patent Application 10-217716 A.*
(Continued)

*Primary Examiner* — Adam Krupicka
(74) *Attorney, Agent, or Firm* — Greer Burns & Crain Ltd.

(57) ABSTRACT

Provided are a reinforcement material, not causing undesired stress and having excellent shape stability characteristics, a rubber product using the material and a method for producing the product, and a pneumatic tire using the material and a method for producing the tire. The reinforcement material for rubber has a flat coil shape where, when the material is in a single free state, loop portions are partly superposed on each other in sequence, and is embedded in a rubber product such as a pneumatic tire.

4 Claims, 6 Drawing Sheets

(51) Int. Cl.
- *B29D 30/70* (2006.01)
- *B60C 9/18* (2006.01)
- *B60C 9/22* (2006.01)
- *B60C 9/26* (2006.01)
- *D07B 1/06* (2006.01)

(56) References Cited

U.S. PATENT DOCUMENTS

| | | | | |
|---|---|---|---|---|
| 1,263,700 A | * | 4/1918 | Porteous | 152/261 |
| 1,365,061 A | * | 1/1921 | Respess | 428/222 X |
| 1,897,411 A | * | 2/1933 | Adams | 267/180 |
| 2,671,745 A | * | 3/1954 | Slayter | 156/177 |
| 3,288,194 A | * | 11/1966 | Frazier | 152/533 |
| 3,294,143 A | * | 12/1966 | Frazier | 152/533 |
| 3,455,100 A | * | 7/1969 | Sidles et. al. | 152/563 X |
| 3,992,239 A | * | 11/1976 | Schroeder | 156/133 |

FOREIGN PATENT DOCUMENTS

| | | | |
|---|---|---|---|
| JP | 63-116904 | | 5/1988 |
| JP | 63116904 A | * | 5/1988 |
| JP | 10-217716 A | | 8/1998 |
| JP | 10-258609 A | | 9/1998 |
| JP | 11-021777 A | | 1/1999 |

OTHER PUBLICATIONS

English machine translation of Japanese Patent Application 10-258609 A.*

English machine translation of Japanese Patent Application 11-21777 A.*

Correct patent family member for JP 63-116904 A, May 21, 1988, already of record.*

PCT International Search Report for PCT/JP2004/000553 mailed on May 11, 2004.

* cited by examiner

REINFORCEMENT MATERIAL FOR RUBBER, RUBBER PRODUCT USING THE MATERIAL AND METHOD FOR PRODUCING THE PRODUCT, PNEUMATIC TIRE USING THE MATERIAL AND METHOD FOR PRODUCING THE TIRE

TECHNICAL FIELD

The present invention relates to a reinforcement material which is suitable as a reinforcement material for a rubber product such as an automobile tire, and has been processed to have a flat coil shape. More particularly, the present invention relates to a reinforcement material, not causing undesired stress and having excellent shape stability characteristics, a rubber product using the material and a method for producing the product, and a pneumatic tire using the material and a method for producing the tire.

BACKGROUND ART

There has been heretofore proposed the use of a steel cord or a steel wire which is processed to have a flat coil shape, as a reinforcement material for a pneumatic tire (for example, see Japanese patent application Kokai publication Nos. Hei 10 (1998)-217716, Hei 10 (1998)-258609, and Sho 63 (1988)-96338). Such a reinforcement material having the flat coil shape has been processed to have a predetermined shape in the following manner. Specifically, a steel cord or a steel wire, which has a cylindrical coil shape, is squeezed from both sides by unvulcanized rubber while being crushed so as to fold respective loop portions in the coil-axis direction. As a result in the reinforcement material having the flat coil shape, a plurality of loop portions are arranged so as to be partly superposed on each other in sequence.

However, the above-described reinforcement material having the flat coil shape is processed while the cylindrical coil shape steel cord or the steel wire being squeezed. Thus, it is difficult to stabilize a shape of the material, and quality of a rubber product is made unstable. Moreover, since the above-described reinforcement material having the flat coil shape is embedded in the rubber product while retaining torsional stress, there may be adverse effects on fatigue resistance of the rubber product. Note that, in sandwiching the steel cord or the steel wire, which has the cylindrical coil shape, by use of unvulcanized rubber while squeezing the cord or the wire, it is required to complicate processing equipment thereof in order to reduce variation in quality. Thus, manufacturing costs of the rubber product are increased.

DISCLOSURE OF THE INVENTION

It is an object of the present invention to provide a reinforcement material, not causing undesired stress and having excellent shape stability characteristics, a rubber product using the material and a method for producing the product, and a pneumatic tire using the material and a method for producing the tire.

A reinforcement material for rubber of the present invention to achieve the foregoing object has a flat coil shape where, when the material is in a single free state, loop portions are partly superposed on each other in sequence. Specifically, the reinforcement material for rubber of the present invention has loop portions which circle around an axis, when the material is in the single free state, so as to form the flat coil shape while inclining to one side with respect to an axial direction. In addition, the respective loop portions of every wrap are sequentially displaced in one direction along the axis, and these loop portions are partly superposed on each other in sequence to form a band shape.

The reinforcement material having the flat coil shape in the single free state as described above can be embedded in rubber without being processed. Moreover, the reinforcement material can be also embedded in rubber after the material is processed to be a sheet with unvulcanized rubber or the like covering the material. In either case, the reinforcement material can be used without causing unnecessary stress. Moreover, since the reinforcement material is produced as a single piece, a shape thereof is easily stabilized. Accordingly, equipment to produce the material can be simplified, and the material can be produced at low cost.

It is preferable that the reinforcement material has not less than 35% of low-stress elongation at a load of 10N. By increasing the low-stress elongation as described above, the material can easily follow a lift at the time of vulcanization in production of a tire, for example. In the foregoing reinforcement material, it is preferable that the number of wraps of other loop portions superposed on an arbitrary loop portion among the plurality of loop portions is set to 1 to 15. Thus, strength and flexibility of the reinforcement material can be compatible.

In the present invention, it is required to previously process the reinforcement material to have the flat coil shape in the single free state. However, by providing reformed portions between loop portions adjacent to each other, the reformed portions having a curvature different from that of the loop portions, it is made possible to further enhance shape stability characteristics of the reinforcement material. In this case, the reinforcement material of the present invention has an entirely new configuration compared to the conventional case, and can be identified even in the state where the material is embedded in rubber.

Specifically, the reinforcement material for rubber of the present invention has the flat coil shape in which the loop portions are partly superposed on each other in sequence, and has the reformed portions between loop portions adjacent to each other, the reformed portions having a curvature different from that of the loop portions.

Furthermore, a rubber product of the present invention has a reinforcement material embedded in rubber, the reinforcement material having a flat coil shape in which loop portions are partly superposed on each other in sequence, and having reformed portions between loop portions adjacent to each other, which have a curvature different from that of the loop portions. Moreover, a method for producing a rubber product of the present invention includes the steps of: forming an unvulcanized rubber product by embedding a reinforcement material in unvulcanized rubber, the reinforcement material having a flat coil shape in which loop portions are partly superposed on each other in sequence, and having reformed portions between loop portions adjacent to each other, which have a curvature different from that of the loop portions; and vulcanizing the unvulcanized rubber product.

Furthermore, a pneumatic tire of the present invention has a reinforcement material embedded in rubber, the reinforcement material having a flat coil shape in which loop portions are partly superposed on each other in sequence, and having reformed portions between loop portions adjacent to each other, which have a curvature different from that of the loop portions. Moreover, a method for producing a pneumatic tire of the present invention includes the steps of: forming an unvulcanized tire by embedding a reinforcement material in unvulcanized rubber, the reinforcement material having a flat coil shape in which loop portions are partly superposed on each other in sequence, and having reformed portions between loop portions adjacent to each other, which have a curvature different from that of the loop portions; and vulcanizing the unvulcanized tire.

As described above, when the reinforcement material having the flat coil shape is formed with the reformed portions provided between loop portions adjacent to each other, the reformed portions having a curvature different from that of the loop portions, the shape of the reinforcement material can be stabilized without causing unnecessary stress. Thus, in production of the rubber product such as the pneumatic tire by use of the above-described reinforcement material having the flat coil shape, it is possible to improve processability and workability, and to ensure a stable quality. Furthermore, fatigue resistance of the rubber product can be improved.

In the present invention, the reformed portions having a curvature different from that of the loop portions may be approximately straight, or may have a smaller curvature (a larger curvature radius) than the loop portions, or may have a larger curvature (a smaller curvature radius) than the loop portions. Particularly, it is preferable that approximately straight reformed portions are formed.

The above-described reinforcement material can be formed of a steel cord which is obtained by aligning or twisting at least a strand of wire. However, particularly, it is preferable that the reinforcement material is formed of one wire (a single steel wire). In the case of forming the steel cord by use of a plurality of wires, it is preferable that the wires are twisted together. As to the twisted structure, a publicly known structure can be applied. Although, in terms of permeability of rubber, 1×n structure is preferable, the structure is not limited thereto.

BRIEF DESCRIPTION OF THE DRAWINGS

FIG. 1(a) is a plan view, FIG. 1(b) is a cross-sectional side view, and FIG. 1(c) is a cross-sectional view taken along the line X-X.

FIG. 2(a) is a plan view and FIG. 2(b) is a cross-sectional side view.

FIG. 6(a) is a side view and FIG. 6(b) is a cross-sectional view taken along the line Y-Y.

BEST MODE FOR CARRYING OUT THE INVENTION

With reference to the accompanying drawings, a configuration of the present invention will be described in detail below.

Figure 1A:
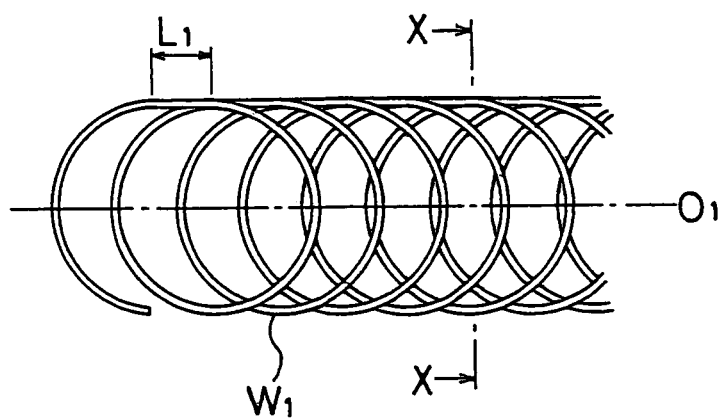
FIGS. 1(a) to 1(c) show a reinforcement material for rubber according to a first embodiment of the present invention.
Figure 1B:
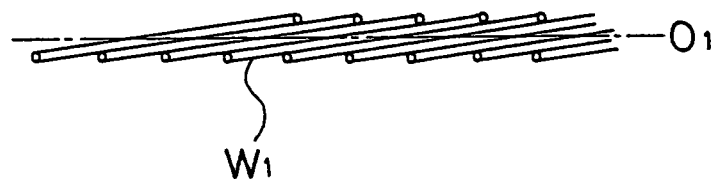
Figure 1C:
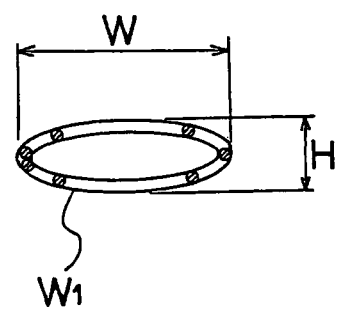
Figure 2A:
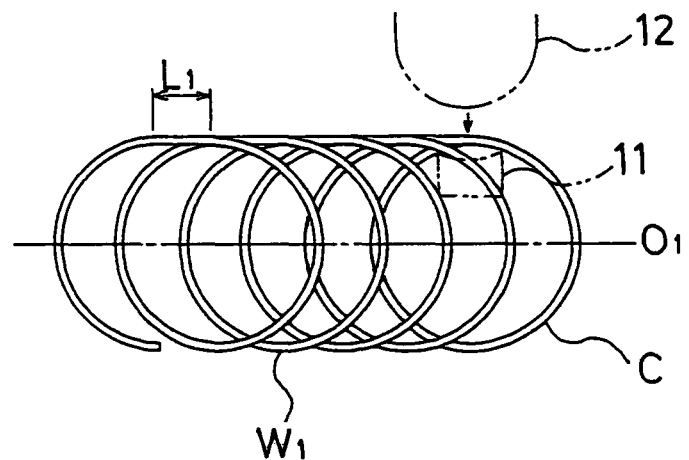
FIGS. 2(a) and 2(b) show the reinforcement material for rubber according to the first embodiment of the present invention in the middle of a forming step.
Figure 2B:
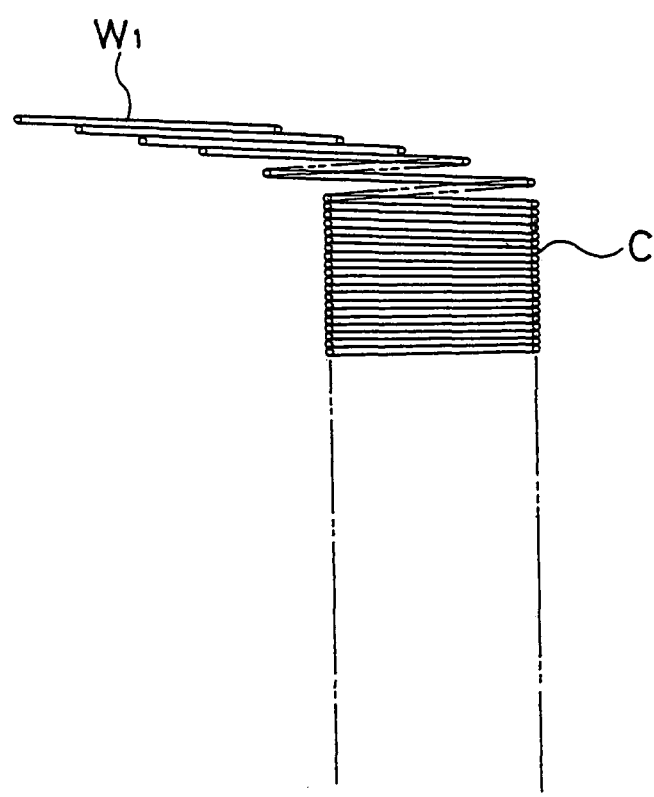

FIGS. 1(a) to 1(c) show a reinforcement material for rubber according to a first embodiment of the present invention. FIGS. 2(a) and 2(b) show the reinforcement material for rubber of the first embodiment in the middle of a forming step. As shown in FIGS. 1(a) to 1(c), the reinforcement material $W_1$ of this embodiment has a flat coil shape where, when the material is in a single free state, loop portions (approximately circular portions) are partly superposed on each other in sequence. In addition, the reinforcement material has approximately straight reformed portions (deformed portions), each having a length $L_1$, between loop portions adjacent to each other.

To be more specific, the reinforcement material $W_1$ has a plurality of loop portions which circle around an axis $O_1$, when the material is in the single free state, so as to form the flat coil shape while inclining to one side (the right side in FIG. 1(b)) with respect to an axial direction. In addition, the respective loop portions of every wrap are sequentially displaced in one direction along the axis $O_1$, and these loop portions are partly superposed on each other in sequence to form a band shape. In the example of FIGS. 1(a) to 1(c), the number of wraps N of other loop portions superposed on an arbitrary loop portion among the plurality of loop portions is 4. Moreover, the approximately straight reformed portions are provided between loop portions adjacent to each other. As a result, a center position (center of a curvature radius) of each of the loop portions on both sides of the reformed portion is shifted toward a direction in which the loop portions spread in the axial direction. Accordingly, the loop portions are displaced for an amount of the shift toward the one side of the axial direction with every wrap.

In order to produce the reinforcement material $W_1$, for example, as shown in FIGS. 2(a) and 2(b), the same areas of loop portions for every wrap of a cylindrical coil C formed by winding a wire (a steel wire or the like) in a cylindrical spiral in an approximately close contact state are sequentially supplied onto a die surface, which is depressed in an arc shape, of a die 11 of a shaping device (not shown). Thereafter, the areas of the loop portions are shaped by being pressed against the die surface at a predetermined pressure by a press processing piece 12. As the cylindrical coil C, used is one previously produced in a separate step by use of a steel wire or the like as a raw material.

In such a manner, in the cylindrical coil C, the same area of the loop portion for each wrap of the coil is pressed against the die surface, which is depressed in the arc shape, of the die 11 at the predetermined pressure by the press processing piece 12. Accordingly, the pressed portion undergoes plastic deformation, and, when the press processing piece 12 is pulled back, the portion becomes approximately straight over the predetermined length $L_1$. Thereafter, the cylindrical coil C for the next wrap is fed without rotating the coil C, and the same area is shaped by similarly pressing the area against the die surface of the die 11 by means of the press processing piece 12. By repeating the above processing, the reinforcement material $W_1$ having the flat coil shape is produced, in which the center positions of the loop portions of every wrap are sequentially displaced in the one direction with a pitch of the length $L_1$ of the reformed portion formed by the shaping.

In the above-described embodiment, the pressure at which the press processing piece 12 is pressed is adjusted so that, in the shaping, the reformed portion undergoes the plastic deformation and becomes approximately straight.

Figure 3:
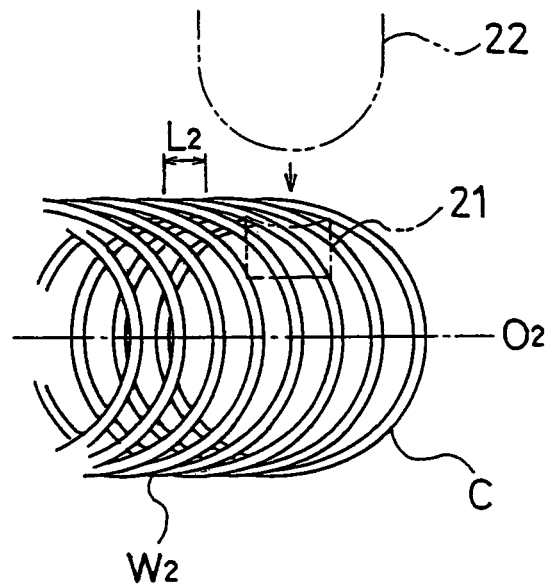
FIG. 3 is a plan view showing a reinforcement material for rubber according to a second embodiment of the present invention in the middle of a forming step.

FIG. 3 shows a reinforcement material for rubber according to a second embodiment of the present invention in the middle of a forming step. As shown in FIG. 3, the reinforcement material $W_2$ of this embodiment has a flat coil shape where, when the material is in a single free state, loop portions (approximately circular portions) are partly superposed on each other in sequence. In addition, the reinforcement material has reformed portions (deformed portions), each having a smaller curvature (a larger curvature radius) than the loop portion, over a length $L_2$, between loop portions adjacent to each other.

To be more specific, the reinforcement material $W_2$ has loop portions which circle around an axis $O_2$, when the material is in the single free state, so as to form the flat coil shape while inclining to one side (the right side in FIG. 3) with respect to an axial direction. In addition, the respective loop portions of every wrap are sequentially displaced in one direction along the axis $O_2$, and these loop portions are partly superposed on each other in sequence to form a band shape. In the example of FIG. 3, the number of wraps N of other loop portions superposed on an arbitrary loop portion among the plurality of loop portions is 7. Moreover, the reformed portions having the small curvature are provided between loop portions adjacent to each other. As a result, a center position (center of a curvature radius) of each of the loop portions on both sides of the reformed portion is shifted toward a direction in which the loop portions spread in the axial direction. Accordingly, the loop portions are displaced for an amount of the shift toward the one side of the axial direction with every wrap.

In order to produce the reinforcement material $W_2$, for example, as shown in FIG. 3, the same areas of loop portions for every wrap of a cylindrical coil C formed by winding a wire (a steel wire or the like) in a cylindrical spiral in an approximately close contact state are sequentially supplied onto a die surface, which is depressed in an arc shape, of a die 21 of a shaping device (not shown). Thereafter, the areas of the loop portions are shaped by being pressed against the die surface by a press processing piece 22. Subsequently, the cylindrical coil C for the next wrap is fed without rotating the coil C, and the same area is shaped by similarly pressing the area against the die surface of the die 21 by means of the press processing piece 22. By repeating the above processing, the reinforcement material $W_2$ having the flat coil shape is produced, in which the center positions of the loop portions of every wrap are sequentially displaced in the one direction with a pitch of the length $L_2$ of the reformed portion formed by the shaping.

In the above-described embodiment, the pressure at which the press processing piece 22 is pressed is adjusted so that, in the shaping, the reformed portion undergoes the plastic deformation not so far as to become approximately straight, but to have a smaller curvature than the other portions.

Figure 4:
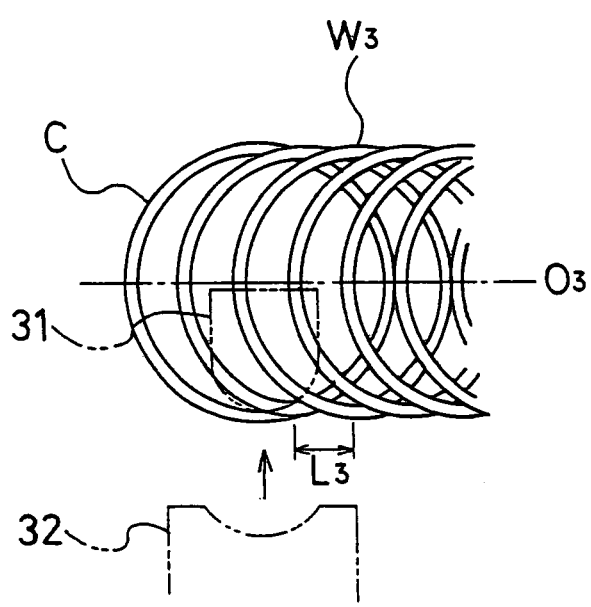
FIG. 4 is a plan view showing a reinforcement material for rubber according to a third embodiment of the present invention in the middle of a forming step.

FIG. 4 shows a reinforcement material for rubber according to a third embodiment of the present invention in the middle of a forming step. As shown in FIG. 4, the reinforcement material $W_3$ of this embodiment has a flat coil shape where, when the material is in a single free state, loop portions (approximately circular portions) are partly superposed on each other in sequence. In addition, the reinforcement material has reformed portions (deformed portions), each having a larger curvature (a smaller curvature radius) than the loop portion, over a length $L_3$, between loop portions adjacent to each other.

To be more specific, the reinforcement material $W_3$ has loop portions which circle around an axis $O_3$, when the material is in the single free state, so as to form the flat coil shape while inclining to one side (the right side in FIG. 4) with respect to an axial direction. In addition, the respective loop portions of every wrap are sequentially displaced in one direction along the axis $O_3$, and these loop portions are partly superposed on each other in sequence to form a band shape. In the example of FIG. 4, the number of wraps N of other loop portions superposed on an arbitrary loop portion among the plurality of loop portions is 4. Moreover, the reformed portions having the large curvature are provided between loop portions adjacent to each other. As a result, a center position (center of a curvature radius) of each of the loop portions on both sides of the reformed portion is shifted toward a direction in which the loop portions contract in the axial direction. Accordingly, the loop portions are displaced for an amount of the shift toward the one side of the axial direction with every wrap.

In order to produce the reinforcement material $W_3$, for example, as shown in FIG. 4, the same areas of loop portions for every wrap of a cylindrical coil C formed by winding a wire (a steel wire or the like) in a cylindrical spiral in an approximately close contact state are sequentially supplied onto a die surface, which is depressed in an arc shape, of a die 31 of a shaping device (not shown). Thereafter, the areas of the loop portions are shaped by being pressed against the die surface by a press processing piece 32. Subsequently, the cylindrical coil C for the next wrap is fed without rotating the coil C, and the same area is shaped by similarly pressing the area against the die surface of the die 31 by means of the press processing piece 32. By repeating the above processing, the reinforcement material $W_3$ having the flat coil shape is produced, in which the center positions of the loop portions of every wrap are sequentially displaced in the one direction with a pitch of the length $L_3$ of the reformed portion formed by the shaping.

In the above-described embodiment, the pressure at which the press processing piece 32 is pressed is adjusted so that, in the shaping, the reformed portion undergoes the plastic deformation so as to have a larger curvature than the other portions.

Since each of the reinforcement materials $W_1$, $W_2$ and $W_3$ has the flat coil shape in the single free state, the reinforcement materials are suitable as a reinforcement material for a rubber product such as an automobile tire, for example, and can be embedded in rubber without being processed. Moreover, the reinforcement material can be also embedded in rubber after the material is processed to be a sheet with unvulcanized rubber or the like covering the material. In either case, the reinforcement material can be used without causing unnecessary stress, and can be used in various forms with a high degree of freedom of usage pattern.

Moreover, since each of the reinforcement materials $W_1$, $W_2$ and $W_3$ is produced as a single piece, a shape thereof is easily stabilized. Accordingly, equipment to produce the material can be simplified, and the material can be produced at low cost. Thus, for example, in producing a rubber product such as a tire by use of these reinforcement materials $W_1$, $W_2$ and $W_3$, it is made possible to improve processability and workability, and to ensure a stable quality.

Each of the reinforcement materials $W_1$, $W_2$ and $W_3$ described above is an example, and the number of wraps of the loop portions can be changed according to usage. Particularly, it is preferable that the number of wraps N of other loop portions superposed on an arbitrary loop portion among the plurality of loop portions is set to 1 to 15. If the number of wraps N is below the lower limit, strength of the material becomes insufficient, and if the number N exceeds the upper limit, flexibility thereof is lowered. Accordingly, the material becomes apt to undergo separation from rubber. Note that the number of wraps N means the number of the other loop portions superposed on the arbitrary loop portion from one direction. It is preferable that a range of the number of wraps N is maintained even in a state where the reinforcement material is embedded in a rubber product.

It is desirable that a wire diameter of each of the reinforcement materials $W_1$, $W_2$ and $W_3$ is 0.10 to 5.00 mm, preferably 0.12 to 2.50 mm. If the wire diameter is below the lower limit, strength of the material becomes insufficient, and if the wire diameter exceeds the upper limit, elongation thereof is insufficient and flexibility thereof is lowered. Accordingly, the material becomes apt to undergo separation from rubber.

In the reinforcement materials $W_1$, $W_2$ and $W_3$, a ratio (H/W×100%) of a coil height H to a coil width W is desired to be 2 to 50% (see FIGS. 1(a) to 1(c)). If this aspect ratio is below the lower limit, strength of the material becomes insufficient, and if the aspect ratio exceeds the upper limit, flexibility thereof is lowered. Accordingly, the material becomes apt to undergo separation from rubber. It is preferable that a range of this ratio of the coil height H to the coil width W is maintained even in a state where the reinforcement material is embedded in the rubber product. There is no particular limitation on the shape of the coil. The coil can also have a polygonal shape, other than a circular shape such as a perfect circle and an ellipse. The reformed portions may be provided either on one side or on both sides in a coil width direction.

In the reinforcement materials $W_1$, $W_2$ and $W_3$, the lengths $L_1$, $L_2$ and $L_3$ of the reformed portions may be 0.02 W to 0.95 W, preferably 0.05 W to 0.50 W, with respect to the coil width W. If the lengths $L_1$, $L_2$ and $L_3$ of the reformed portions are below the lower limit, shape stability characteristics of the reinforcement material are lowered, and flexibility of the reinforcement material is lowered. Accordingly, the material becomes apt to undergo separation from rubber. Moreover, if the lengths $L_1$, $L_2$ and $L_3$ of the reformed portions exceed the upper limit, strength of the material becomes insufficient. The coil width W may be selected from a range of 3.0 to 150.0 mm.

In the case of use for reinforcement of a tire, each of the reinforcement materials $W_1$, $W_2$ and $W_3$ is required to have not less than 35% of, preferably not less than 80% of low-stress elongation at a load of 10N. If this low-stress elongation is small, for example, it becomes difficult to follow a lift at the time of vulcanization in production of a tire.

Figure 5:
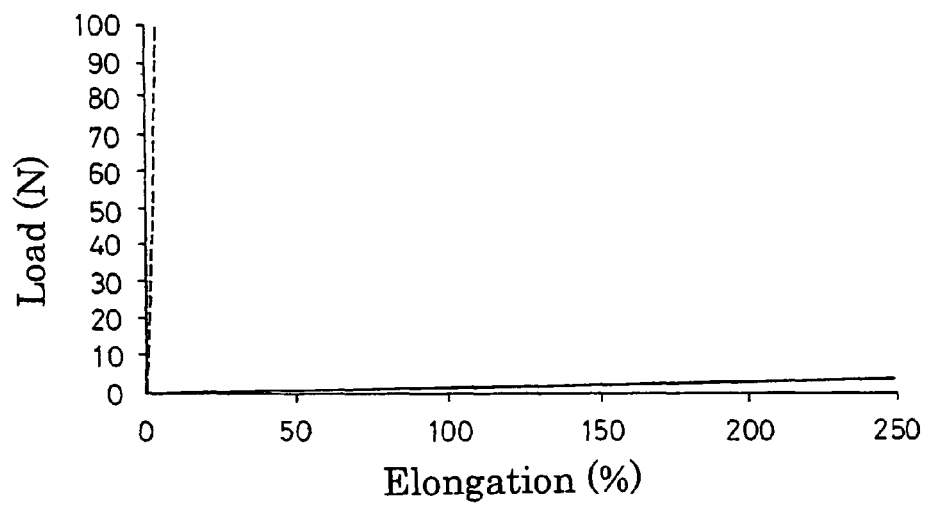
FIG. 5 is a graph showing a relationship between load (N) and elongation (%) in the reinforcement material for rubber of the present invention.

FIG. 5 shows low-stress elongation characteristics of the reinforcement material for rubber used in the present invention. In FIG. 5, the solid line is the case of the reinforcement material having the flat coil shape, and the broken line is the case of a high elongation cord obtained by coarsely twisting a plurality of steel wires. As is clear from the graph, according to the reinforcement material having the flat coil shape of the present invention, it is easy to satisfy the requirement of not less than 150% of low-stress elongation, for example. The above-described low-stress elongation characteristics can be measured by use of the following test apparatus.

Figure 6:
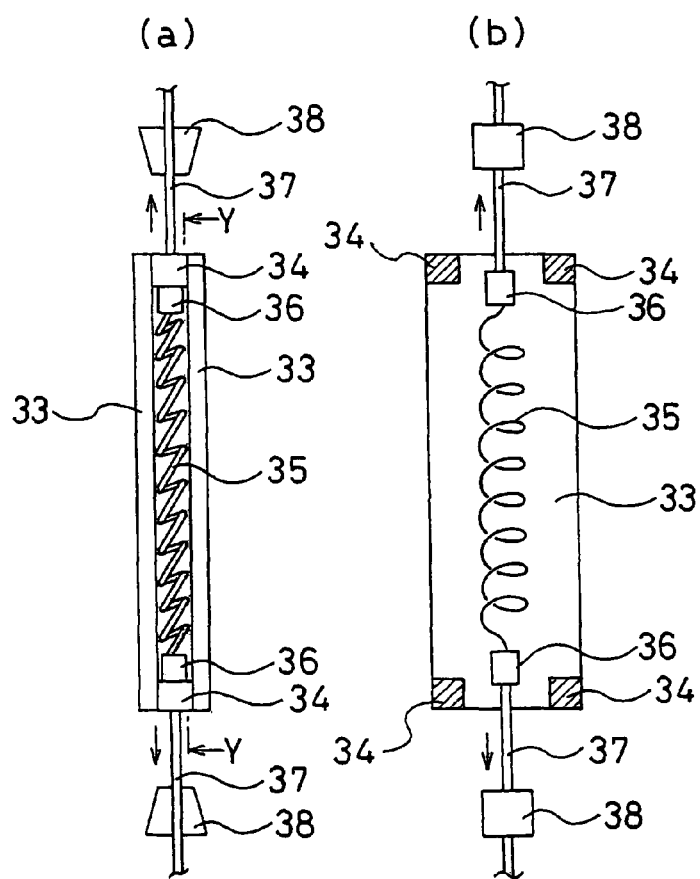
FIGS. 6(a) and 6(b) show a load-elongation test apparatus for the reinforcement material for rubber of the present invention.

FIGS. 6(a) and 6(b) show a load-elongation test apparatus for the reinforcement material for rubber, which is used in the present invention. It is required to conduct the above-described load-elongation test of the reinforcement material for rubber so as to reproduce elongation of the reinforcement material in the state where the material is embedded in rubber. In FIGS. 6(a) and 6(b), a pair of resin fitting plates 33 and 33 are joined parallel to each other with four spacers 34 interposed therebetween, the spacers being arranged in corners of the plates. As a result, a space of the coil height H+1.5 mm is formed between the pair of fitting plates 33 and 33. A test piece 35 of a reinforcement material is set between the pair of fitting plates 33 and 33, and both ends thereof are connected to an unillustrated tensile testing machine through crimp contacts 36, straight steel wires 37 and chucks 38, respectively.

When the low-stress elongation characteristics of the reinforcement material for rubber are measured by use of the test apparatus configured as described above, the test piece 35 is pulled in the axial direction by the tensile testing machine, and load (N) and elongation (%) thereof are measured. In this event, swelling of the test piece 35 in a direction perpendicular to the axial direction is controlled by the fitting plates 33, and the test piece substantially elongates only in the axial direction. Thus, it is made possible to reproduce the elongation of the reinforcement material in the state where the material is embedded in rubber. As the tensile testing machine, an Instron tensile testing machine can be used. For example, a length of the test piece (a distance between the crimp contacts) may be set to 100 mm, and a tension speed may be set to 20 mm/minute.

Figure 7:
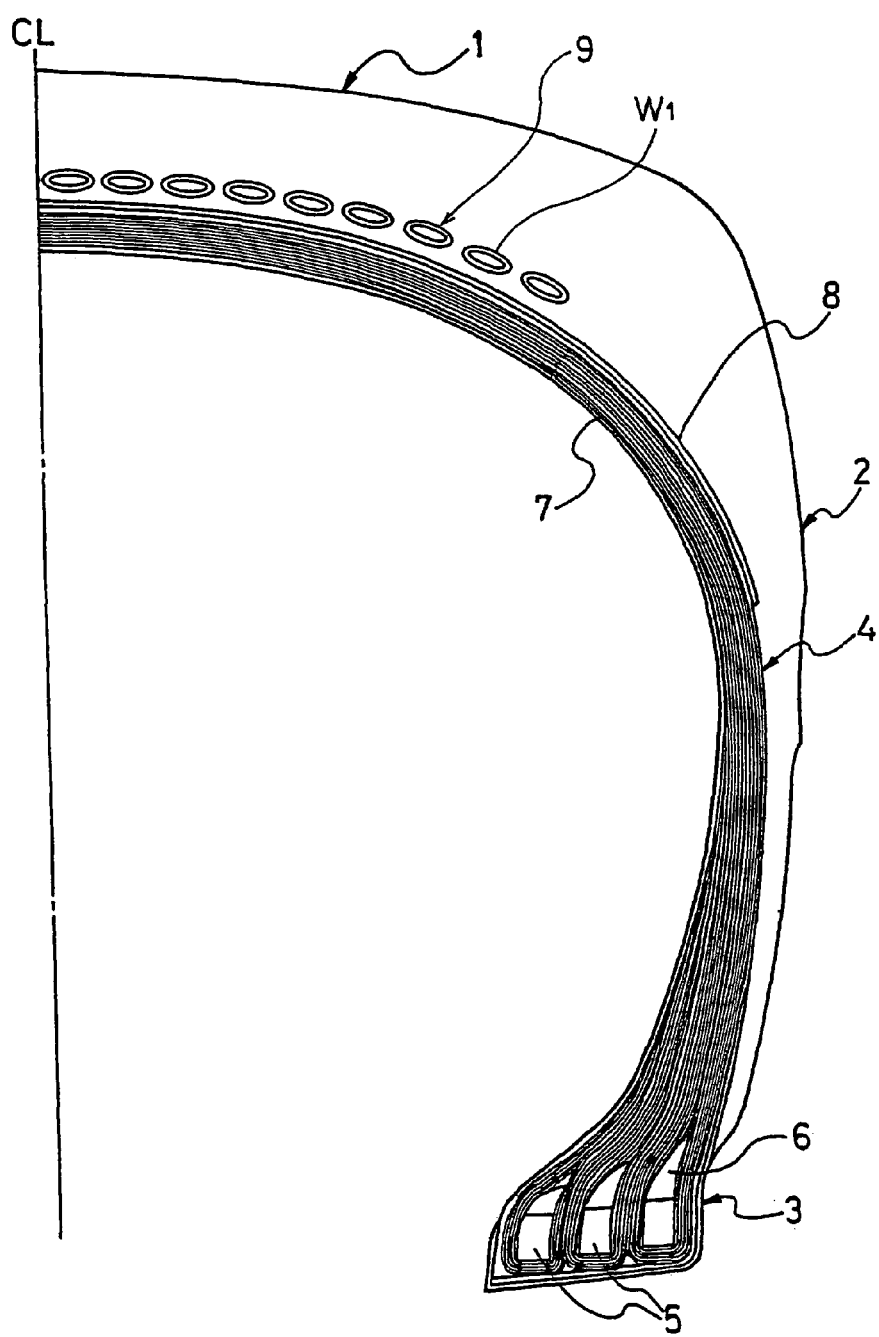
FIG. 7 is a meridian half sectional view showing an example of a pneumatic tire using the reinforcement material for rubber of the present invention.

FIG. 7 shows an example of a pneumatic tire using the reinforcement material for rubber of the present invention. Reference numeral 1 denotes a tread portion, 2 denotes a sidewall portion, and 3 denotes a bead portion. Between a pair of bead portions 3 and 3 is arranged a plurality of carcass layers 4. These carcass layers 4 are laminated so as to allow reinforcing cords thereof to intersect with each other between the layers. In each of the bead portions 3, three bead cores 5 are embedded. Both ends of the carcass layers 4 are folded around the bead cores 5 from an inner side of a tire toward an outer side thereof so as to sandwich bead fillers 6. Inside of the carcass layers 4, inner liner layer 7 is provided between the left bead portion (not shown) and the right bead portion 3. Moreover, in an outer periphery side of the carcass layers 4 between both sidewall portions 2 and 2, a breaker layer 8 formed of an organic fiber cord is embedded. Furthermore, in an outer periphery side of the breaker layer 8 formed of the organic fiber cord, a breaker layer 9 formed of a steel cord is embedded. Note that CL means a tire centerline passing through the tire equatorial plane.

In the foregoing pneumatic tire, the above-described reinforcement material $W_1$ having the flat coil shape is used, for example, as the breaker layer 9, and the reinforcement material $W_1$ is continuously wound in a tire circumferential direction. An angle at which the reinforcement material $W_1$ inclines with respect to the tire circumferential direction may be set to approximately 0°. Alternatively, the reinforcement material $W_1$ may be folded zigzag while inclining with respect to the tire circumferential direction. Incidentally, it is needless to say that, instead of the reinforcement material $W_1$ having the flat coil shape, the reinforcement material $W_2$ or the reinforcement material $W_3$ can be used.

When such a reinforcement material $W_1$ having the flat coil shape is used as the breaker layer 9 of the pneumatic tire, quality of the breaker layer 9 is stabilized. As a result, fatigue resistance and cutting resistance can be improved. Moreover, since the reinforcement material $W_1$ having the flat coil shape is flexible and has a large elongation, the material is most suitable as a reinforcement material for rubber. Furthermore, the reinforcement material $W_1$ having the flat coil shape virtually has no ends, which contributes to improvement in separation resistance.

In the case of producing the above-described pneumatic tire (rubber product), after the reinforcement material $W_1$ having the flat coil shape is embedded in unvulcanized rubber to form an unvulcanized tire (unvulcanized rubber product), the unvulcanized tire is vulcanized. Here, the reinforcement material $W_1$ may be supplied to the step of forming the unvulcanized tire in a state where the material is not covered with rubber. However, in that case, the size of the reinforcement material $W_1$ may be disturbed, or rubber coating may become insufficient. Accordingly, it is preferable that the reinforcement material $W_1$ is supplied to the step of forming the unvulcanized tire in the state where the reinforcement material $W_1$ is covered with rubber.

Figure 8:
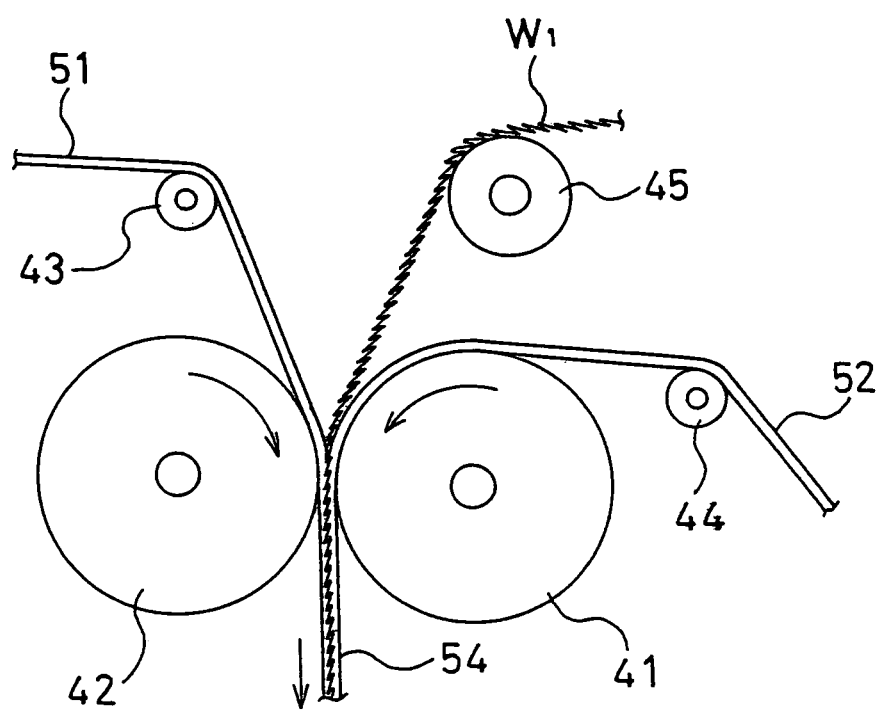
FIG. 8 is a side view showing a rubber coating step for the reinforcement material for rubber of the present invention.

FIG. 8 is a view showing a step of covering the reinforcement material for rubber of the present invention with rubber, and processing the material into a sheet. In FIG. 8, reference numerals 41 and 42 denote press rolls, and reference numerals 43 to 45 denote guide rolls. The press roll 41 is configured to be rotated and driven by unillustrated drive means, and the press roll 42 is driven with the rotation of the press roll 41.

A strip 51 made of unvulcanized rubber is pushed out of an unillustrated extruding machine, and is supplied from the above to a gap between the press rolls 41 and 42 through the guide roll 43. Meanwhile, a strip 52 made of unvulcanized rubber is pushed out of an unillustrated extruding machine, and is supplied from the side to the gap between the press rolls 41 and 42 through the guide roll 44. Moreover, the reinforcement material $W_1$ processed to have the flat coil shape is supplied between the strips 51 and 52 through the guide roll 45. Accordingly, the reinforcement material $W_1$ and the strips 51 and 52 pass through the gap between the press rolls 41 and 42. Thus, a sheet material 54 including the reinforcement material $W_1$ is continuously formed. Such a sheet material 54 including the reinforcement material $W_1$ may be attached to an area to be reinforced in the pneumatic tire according to need. In the tire production step as described above, since the reinforcement material $W_1$ having the flat coil shape has a stable size, it is easy to process and handle the material. Moreover, since behavior of the above-described reinforcement material $W_1$ having the flat coil shape is stable in processing thereof, there is no need to complicate material feeding equipment. Thus, manufacturing costs of the pneumatic tire can be reduced. Furthermore, even if the reinforcement material $W_1$ having the flat coil shape is continuously wound in the tire circumferential direction in the tread portion, the material can follow a lift (expansion in a tire radial direction) in vulcanization.

In the above-described embodiments, the description was given of the case where the rubber product is the pneumatic tire. In the present invention, a conveyor belt, a marine hose, a fender, and the like can be cited as the rubber product. Moreover, the area to be reinforced in the pneumatic tire is not particularly limited, and the reinforcement material can be used for various areas of the pneumatic tire.

APPLICATION EXAMPLE

Pneumatic tires of a conventional example, a comparative example and an application example are produced, respectively, in which only structures of a steel breaker ply are different from each other as shown in Table 1. Specifically, the pneumatic tire is for an ore-carrying truck and has a tire size of 1200-24 16PR, has a smooth tread of TRA CODE: L4, and has a bias structure including 8 nylon carcass plies, 2 nylon breaker plies and a steel breaker ply.

In the conventional example, a calendar material obtained by aligning a plurality of linearly extending steel cords and embedding the cords in rubber is processed, and a breaker ply is formed by use of the calendar material. In the comparative example, a sheet material is formed by covering a steel cord (steel wire) having a cylindrical coil shape with rubber from its both sides simultaneously with the squeezing of the cord in a flat coil shape, and a breaker ply is formed by use of the sheet material. In the application example, a sheet material is formed by covering a steel cord (steel wire), which has been previously formed to have a flat coil shape, with rubber from its both sides, and a breaker ply is formed by use of the sheet material.

As to these test tires, cutting resistance and forming productivity of a steel breaker ply are evaluated by use of the following test method. Table 1 shows the results.

[Cutting Resistance]

The test tires are rim assembled at an air pressure of 550 kPa, fitted to an ore-carrying truck, and actually used for material handling work in a mine. Thereafter, damage conditions caused by cuts are checked, and an overall length of the cuts reaching a nylon breaker is obtained. The evaluation results are indicated as indices when the conventional example is assumed to be 100 by using reciprocals of measured values. The larger the index values are, the better the cutting resistance is.

[Forming Productivity of Steel Breaker Ply]

The time required to form the steel breaker ply on a forming drum is measured. The evaluation results are indicated as indices when the comparative example is assumed to be 100 by using reciprocals of measured values. The larger the index values are, the better the forming productivity (processability and workability) of the steel breaker ply is.

TABLE 1

|  | Conventional example | Comparative example | Application example |
| --- | --- | --- | --- |
| Number of plies in steel breaker | Two layers | Two layers | Two layers |
| Cord angle (°) | 26 | 0 | 0 |
| Cord twisted structure | 3 + 9 + 15 | 1 × 1 | 1 × 1 |
| Wire diameter (mm) | 0.17 | 0.50 | 0.50 |
| Cord shape | Closed | Coil shaped | Coil shaped |
| Coil shape | — | Circle | Circle |
| Approximately straight reformed portion | — | Not present | Present |
| Length L of reformed portion | — | — | 0.14 W |
| Number of wraps N * | — | 3 | 3 |
| Coil width W (mm) | — | 15.0 | 15.0 |
| Aspect ratio (H/W × 100%) * | — | 12 | 12 |
| Cutting resistance | 100 | 140 | 145 |
| Forming productivity of steel breaker ply | — | 100 | 160 |

* Measured values at 80% elongation

As is clear from Table 1, the tire of the application example shows significantly improved cutting resistance compared to the tire of the conventional example, and also shows improvement effects when compared to the tire of the comparative example. Moreover, in the application example, the reinforcement material having the flat coil shape includes the approximately straight reformed portions, and has better shape stability characteristics. Thus, the application example shows better forming productivity of the steel breaker ply than that of the comparative example.

INDUSTRIAL APPLICABILITY

According to the present invention, a reinforcement material, not causing undesired stress and having excellent shape stability characteristics is provided. Moreover, in production of a rubber product such as a pneumatic tire, it is possible to improve processability and workability, and to ensure a stable quality. Furthermore, fatigue resistance of the rubber product can be improved.

Although the embodiments of the present invention have been described in detail above, it should be understood that various changes, alternatives, and substitutions can be made to these embodiments without departing from the spirit and scope of the present invention, which are defined by the attached claims.

What is claimed is:

1. A reinforcement material for rubber having a flat coil shape where, when the material is in a single free state, circular loop portions are partly superposed on each other in sequence, the circular loop portions terminating without making a complete circle, and between adjacent circular loop portions, having a non-linear reformed portion with a larger radius of curvature than that of the circular loop portions, the non-linear reformed portion being formed by causing plastic deformation.

2. The reinforcement material for rubber according to claim 1, wherein the number of wraps of other loop portions superposed on an arbitrary loop portion is set to 1 to 15.

3. The reinforcement material for rubber according to claim 1, which has a low-stress elongation at a load of 10 N of 80% or above.

4. The reinforcement material for rubber according to claim 1, wherein the reformed portion has a length within a range of 0.05 W to 0.50 W of a coil width W of the flat coil shape.

* * * * *